United States Patent Office 2,700,675
Patented Jan. 25, 1955

2,700,675

METHOD OF PREPARING MONOMERIC ORGANO-TIN DIALKOXIDES

Gerry P. Mack, Jackson Heights, and Emery Parker, New York, N. Y., assignors to Advance Solvents & Chemical Corporation, a corporation of New York No Drawing. Application July 12, 1950,
Serial No. 173,478

7 Claims. (Cl. 260—429)

The invention relates to a method of preparing organo-tin dialkoxides or dialcoholates of the general formula R₂Sn(OR')₂ wherein R stands for an alkyl or aryl group and R' for an alkyl, aralkyl, or alicyclic group.

The known methods for preparing these compounds give very poor yields and the obtained products contain large amounts of organo-tin oxide and/or halide.

In our copending application, Serial No. 29,935, filed May 28, 1948, of which this application is a continuation-in-part, we have described a method for preparing organo-tin dialkoxides which consists in reacting an organo-tin halide in an anhydrous organic solvent with an alcoholate or with an alcohol in the presence of an alkali metal, ammonia or a tertiary amine, removing the precipitated halide and distilling off the solvent under reduced pressure at temperatures not exceeding 150° C. In this way a product is obtained which consists of a mixture of monomeric and polymeric dialkoxides, the proportion of polymeric dialkoxides increasing with increasing temperatures and prolonged periods of heating. The polymeric and monomeric dialkoxides can be separated by treating the mixture with a lower alcohol, in which only the monomeric compounds are soluble.

It is a principal object of this invention to improve the process described in said prior application and to provide a method which readily produces from organo-tin halides in good yields directly monomeric organo-tin dialkoxides which are substantially free of halogen and polymers.

Other objects and advantages will be apparent from a consideration of the specification and claims.

The improvement over the method described in our copending application, Serial No. 29,935, consists in carrying out the reaction between organo-tin dihalides and lower aliphatic alcohols with completely anhydrous reactants at temperatures below 20° C., preferably 0–5° C., in carefully dried equipment and in distilling off the solvent under reduced pressure under rigorous exclusion of moisture, whereby also the access of air or oxygen should preferably be avoided. In this way, it is possible to obtain substantially halogen-free organo-tin dialcoholates of alcohols containing not more than 4 C atoms directly in the monomeric state in high yields.

The reactions referred to hereinbefore may be represented by the following equations:

(1)     R₂SnX₂+2R'OM→R₂Sn(OR')₂+2MeX
(2)     RSnX+2NH₃+2R'OH→RSn(OR')+2NH₄X wherein R is alkyl or aryl, X is halogen, OR' represents the residue of an aliphatic alcohol having not more than 4 C atoms and Me is an alkali metal. As stated hereinbefore, the ammonia in Equation 2 may be replaced by a tertiary amine. Such amines are, for instance, trimethylamine, triethylamine, tributylamine, dimethylaniline, pyridine, N-methylmorpholine, and others. However, we prefer Reaction 1 to Reaction 2 because of the insolubility of the alkali halide in the organic solvent, which facilitates the removal of the halogen.

Examples of dialkyl and diaryl tin dihalides which may be employed in making the dialkoxides include the following: dimethyl, diethyl, dipropyl, dibutyl, dihexyl, dioctyl, dilauryl, diphonyl, dibenzyl tin dichloride, and others.

In the same way the corresponding dibromides may be used.

As alcohols for the preparation of the dialkoxides, we can use saturated or unsaturated straight or branched chain lower primary, secondary, or tertiary aliphatic alcohols, such as: methyl alcohol, ethyl alcohol, propyl alcohol, butyl alcohol, isopropyl alcohol, sec. and tert. butyl alcohol, allyl alcohol, methallyl alcohol, and others.

We can use also other alcohols and thioether alcohols, such as methoxy ethanol, hydroxy ethyl methyl sulfide, and others.

Whenever possible, we dissolve the organo-tin dihalides in the same alcohol with which they are subsequently brought to reaction and we carry out the reaction in the anhydrous alcohol which is to form the alkoxy groups of the tin compound. In this way, only a single distillation step is necessary to obtain the pure dialcoholate; this is important because any rise of temperature such as is necessary for distilling off a solvent tends to polymerize the monomeric dialcoholates which are very unstable compounds; therefore, the reaction mixture and reaction products should be subjected to as few distillation steps as possible.

As the presence of water is objectionable in the preparation of the monomeric organo-tindialkoxides, the intermediate alkali alcoholates should be prepared by methods in which no water is formed, or if formed, can be completely eliminated. Therefore, we prefer to use metallic sodium, or potassium, or sodium hydride in the preparation of alcoholates from the water soluble or low boiling alcohols.

In order to obtain products which contain no halogen or only traces of halogen, it seems to be necessary to prevent the organo-tin halide from contacting alkali metal but to react it only with the alkali alcoholate solution.

The halogen-free monomeric organo-tin dialcoholates obtained according to the invention are valuable intermediates for the preparation of other organo-tin compounds and they offer a very convenient way to introduce the dialkyl or diaryl tin radical into organic compounds. They may be also converted into polystannanediol ethers by subjecting them to elevated temperatures in the presence of water vapor. When, for instance, in a vacuum distillation of a monomeric organo-tin dialkoxide, the pressure is regulated as usual by letting air in through a capillary tube, and when said air is saturated with moisture, the monomer is very quickly converted to the polymer according to the equation:

(3)     nR₂Sn(OH')₂→R'O(SnR₂O)ₙR'+2(n−2)R'OH

and only the respective alcohol and a negligible amount of the monomer are distilled off.

It has been suggested to use monomeric organo-tin dialcoholates as stabilizers for resin compositions containing vinyl chloride units and for other halogen-containing resins, though they present for this purpose serious drawbacks in view of their instability and because of their extreme sensitivity to moisture.

We have found a convenient way to handle and store such organo-tin dialkoxides, which method is particularly suited for admixing the monomeric dialkoxides with resins. This method consists in dissolving the dialkoxides in high boiling esters or hydrocarbons which are useful of themselves as plasticizers in the compounding of the resins, such as phthalates, like dioctylphthalate and similar compounds, adipates, sebacates, or organic esters of glycols, phosphoric acid, tetrahydrofurfurol, e. g. tetrahydrofurfuryloleate. Said solutions may then be readily added to the resin mix.

The preparation of monomeric organo-tin dialkoxides according to the invention is illustrated but not limited by the following examples.

Example 1

170.2 g. of sodium metal were dissolved under cooling in 1660 cc. of absolute methanol; this solution was cooled to 0° C. and a solution of 1138 g. of dibutyl tin dichloride in 1250 cc. of absolute methanol was added thereto slowly under cooling and rapid stirring in a rate to keep the temperature below 5° C. After the addition was completed, stirring was continued until the batch proved on titration to be neutral. The precipitate was filtered off and the

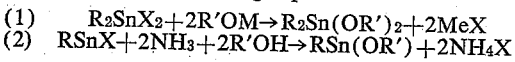

methanol distilled off under reduced pressure at a temperature of about 40° C. During all phases of the preparation, dry nitrogen was bubbled through the mixture.

In this way, almost pure monomeric dibutyl dimethoxide was obtained in 92.7% yield. It contained 40.8% C, 8.55% H, 39.93% Sn, 20.9% methoxy and no chlorine. The boiling point was 136–139° C. at 1.2 mm., the molecular weight in camphor 332, the specific gravity at 20° C. 1.2862 and the refractive index at 20° C. 1.4831.

A water-clear colorless dibutyl tin dimethoxide having only traces of chlorine and the same physical characteristics as the compound described above was obtained also when the reaction was carried out at a temperature of about 50° C.

Example 2

9.2 g. of sodium were dissolved in 200 cc. of absolute methanol under cooling, and to the cooled solution 49.5 g. of diethyl tin dichloride were added at 0–5° C. The progress of the reaction was followed by determining the alkalinity of the batch. After the solution became neutral the salt formed in the reaction was filtered off and then the methanol was distilled under reduced pressure. During the distillation of the methanol more salt separated out which was filtered off. After all methanol had been distilled out at reduced pressure of about 100 mm. Hg, a liquid product was obtained which was fractionated and was found to boil at 125° C. at 3 mm. pressure. During the entire process care was taken to prevent the access of humidity into the equipment used for the preparation.

The obtained product was monomeric diethyl tin methoxide and contained 49.61% Sn and 26.0% methoxy.

Example 3

18.4 g. of sodium metal were dissolved under cooling in 800 cc. of n-butyl alcohol; 121.6 g. of dibutyl tin dichloride, dissolved in 200 cc. of n-butyl alcohol, were added to said clear sodium butoxide solution at 0° C. with simultaneous introduction of dry nitrogen. The reaction mixture was carefully protected from moisture and the formed precipitate was allowed to settle to the bottom of the reaction vessel; the supernatant solution was siphoned off under nitrogen pressure. After distilling off the butanol at 100° C. and 5 mm. Hg pressure, a clear liquid was obtained, the composition of which was very close to the formula $(C_4H_9)_2Sn(OC_4H_9)_2$. The product was stable only when well protected from moisture.

Example 4

18.4 g. of sodium metal were dissolved in 400 cc. of absolute methanol and to the clear solution 99 g. of diethyl tin dichloride dissolved in 150 cc. of methanol were slowly dropped in. The temperature rose rapidly and was maintained by cooling at 20–30° C. The access of moisture was prohibited by protecting the reaction vessel with drying tubes. After the reaction mixture became neutral, the salt was filtered off and the methanol distilled under reduced pressure. The residue was a colorless oil obtained in a yield of 94% based on the theoretical yield. According to the analysis it had the formula

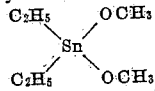

and contained 49.83% Sn and 25.88% OCH₃ (required 49.72% Sn and 25.96% OCH₃). The boiling point of the diethyl tin dimethoxide was 124–126° C. at 3 mm. Hg pressure. At 20° C., it had the specific gravity of 1.4804 and a refractive index of 1.4206.

Example 5

9.2 g. of sodium metal were dissolved in 250 cc. of absolute methanol, and to the clear solution a solution of 70 g. of diphenyl tin dichloride in absolute methanol was added slowly under cooling. After the reaction mixture became neutral, the salt formed in the reaction was filtered off and the excess methanol distilled off under reduced pressure. The residue was a colorless sticky wax-like product which solidified on standing in the vacuum desiccator to a white solid. The obtained product was diphenyl tin dimethoxide of the formula

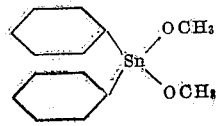

and contained 35.40% of Sn and 18.40% of OCH₃ (theoretically 35.45% Sn and 18.52% OCH₃). It had no melting point and decomposed on heating at 270° C.

Example 6

11.5 g. of sodium metal were dissolved under cooling in 300 cc. of allyl alcohol. To the solution so obtained, a solution of 76.0 g. of dibutyl tin dichloride in 70 cc. of allyl alcohol was added under strong stirring and cooling at 0–5° C. After the reaction was completed, the sodium chloride formed in the reaction was filtered off, then the excess allyl alcohol was removed under reduced pressure at a temperature not exceeding 30° C. During all those operations extreme care was taken to avoid a contact with moist air, which was accomplished by leading dry nitrogen gas through the reaction mixture and filtering the batch under nitrogen pressure. The remaining liquid product, after removing a small amount of sodium chloride which precipitated during vacuum distillation, corresponded to dibutyl tin dialloxide of the formula

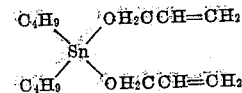

The tin content of the compound was 36.38% (required 36.54%) and the allyl alcohol content was 36.0% (required 35.8%). The compound was easily soluble in organic solvents but it hydrolyzed when exposed to moist air, and become insoluble in cold alcohols.

From the foregoing examples, it will be noted that the tendency of the organo-tin dialkoxides to polymerize during their preparation increases with increasing length of the hydrocarbon chain of the respective alcohol. Whereas pure monomeric organo-tin methoxides can be readily obtained at temperatures of about 50° C., cooling to progressively lower temperatures must be applied when the reaction is carried out with alcohols having up to 4 C atoms. We have not been able to obtain, in the manner described, directly pure monomeric dialkoxides of alcohols having more than 4 C atoms. Similarly, except in the case of methanol, the removal of the unreacted alcohol has to be carried out under reduced pressure at relatively low temperatures as quickly as possible in order to avoid polymerization during the distillation step.

Polymeric dialkyl and diaryl tin dialkoxides and their preparation are claimed in our copending application, Serial No. 29,935, filed May 28, 1948.

Various modifications in the composition and in the preparation of the monomeric organo-tin dialkoxides will be apparent to those skilled in the art and such modifications are included in the scope of the invention as defined by the appended claims.

What we claim is:

1. A process for preparing substantially halogen-free compositions containing monomeric dialkyl tin dialkoxides from dialkyl tin dihalides comprising the steps of causing a dialkyl tin dihalide to react under anhydrous conditions at a temperature below 20° C. with substantially the stoichiometric amount of an alkali metal alcoholate of an alcohol having not more than 4 C atoms, removing the precipitated alkali halide, and distilling off the solvent at reduced pressure under completely dry conditions.

2. A process as defined in claim 4 wherein an alkali metal alcoholate of a saturated alcohol is employed.

3. A process as defined in claim 4 wherein an alkali metal alcoholate of an unsaturated alcohol is employed.

4. A process for preparing substantially halogen-free monomeric dialkyl tin dialkoxides comprising the steps of dissolving a dialkyl tin dihalide in an anhydrous alcohol containing not more than 4 carbon atoms, reacting said solution at a temperature below 20° C. under exclusion of moisture with an alkali alcoholate of the alcohol used as a solvent for the dialkyl tin dihalide, removing the formed precipitates, and distilling off the unreacted alcohol in the presence of a compeltely dry inert gas under reduced pressure.

5. A process as defined in claim 4, wherein the dialkyl tin dihalide and the alkali alcoholate are reacted with each other in substantially equimolecular amounts.

6. A process for preparing substantially halogen-free monomeric dialkyl tin dimethoxide comprising the steps of dissolving a dialkyl tin dihalide in anhydrous methanol, reacting said solution under anhydrous conditions at a temperature below 20° C. with alkali methylate, removing the precipitated alkali halide and distilling off the unreacted methanol in the presence of a completely dry inert gas.

7. A process for preparing monomeric dibutyl tin dimethoxide substantially free of chloride and dibutyl tin oxide comprising the steps of dissolving dibutyl tin dichloride in anhydrous methanol, reacting said solution under anhydrous conditions with alkali methylate at a temperature not exceeding about 5° C. so as to substantially prevent the formation of dibutyl tin oxide, removing the precipitated alkali chloride, and distilling off the unreacted methanol under reduced pressure in the presence of a completely dry inert gas at a temperature not exceeding about 40° C.

References Cited in the file of this patent

UNITED STATES PATENTS

| | | |
|---|---|---|
| 2,453,520 | Langkammerer | Nov. 9, 1948 |
| 2,476,833 | Albert | July 19, 1949 |
| 2,481,086 | Cleverdon et al. | Sept. 6, 1949 |
| 2,484,508 | Hill | Oct. 11, 1949 |
| 2,489,518 | Burt | Nov. 29, 1949 |

OTHER REFERENCES

Aronheim: Ann. der Chemie, vol. 194 (1878).